United States Patent
Haltmayer et al.

(10) Patent No.: US 9,750,391 B2
(45) Date of Patent: Sep. 5, 2017

(54) WATER-BEARING DOMESTIC APPLIANCE, IN PARTICULAR DOMESTIC DISH WASHER

(71) Applicant: BSH Bosch und Siemens Hausgeräte GmbH, Munich (DE)

(72) Inventors: Werner Haltmayer, Dinkelsbühl (DE); David Hite, New Bern, NC (US)

(73) Assignee: BSH Hausgeräte GmbH, Munich (DE)

( * ) Notice: Subject to any disclaimer, the term of this patent is extended or adjusted under 35 U.S.C. 154(b) by 677 days.

(21) Appl. No.: 13/798,245

(22) Filed: Mar. 13, 2013

(65) Prior Publication Data

US 2014/0263876 A1    Sep. 18, 2014

(51) Int. Cl.

| | |
|---|---|
| A47B 77/06 | (2006.01) |
| A47K 1/04 | (2006.01) |
| A47L 19/02 | (2006.01) |
| E03C 1/18 | (2006.01) |
| A47L 15/42 | (2006.01) |
| F16L 3/13 | (2006.01) |
| F16L 3/223 | (2006.01) |

(52) U.S. Cl.
CPC ............. *A47L 15/427* (2013.01); *F16L 3/13* (2013.01); *F16L 3/223* (2013.01)

(58) Field of Classification Search
CPC .................................................. A47L 15/4217
USPC ....... 248/65, 67.7, 68.1, 70, 71, 73; 312/228
See application file for complete search history.

(56) References Cited

U.S. PATENT DOCUMENTS

| | | | | |
|---|---|---|---|---|
| 4,234,012 | A | * | 11/1980 | Schupback ................. 137/899.1 |
| 5,597,980 | A | * | 1/1997 | Weber .......................... 174/72 A |
| 5,606,150 | A | * | 2/1997 | Radliff et al. ................... 174/92 |
| 5,954,301 | A | * | 9/1999 | Joseph et al. ................ 248/68.1 |
| 6,061,880 | A | * | 5/2000 | Senninger ........................ 24/339 |
| 6,268,566 | B1 | * | 7/2001 | Takiguchi et al. .......... 174/72 A |
| 6,469,254 | B1 | * | 10/2002 | Lee et al. ................... 174/138 G |
| 6,875,916 | B2 | * | 4/2005 | Winkelbach et al. ........ 174/482 |
| 7,964,796 | B2 | * | 6/2011 | Suzuki ......................... 174/72 C |
| 8,262,035 | B2 | * | 9/2012 | Bleus et al. ................. 248/68.1 |
| 2007/0246614 | A1 | * | 10/2007 | Allmann et al. ................ 248/65 |
| 2009/0242709 | A1 | * | 10/2009 | Aninger et al. ................. 248/65 |
| 2009/0242710 | A1 | * | 10/2009 | Quertelet et al. ............... 248/65 |
| 2011/0012485 | A1 | * | 1/2011 | Busing et al. ................. 312/228 |

(Continued)

*Primary Examiner* — Terrell McKinnon
*Assistant Examiner* — Michael McDuffie
(74) *Attorney, Agent, or Firm* — Michael E. Tschupp; Andre Pallapies

(57) ABSTRACT

A freestanding domestic appliance includes at least one mounting aid which has at least two functional parts arranged on its front side, wherein a first functional part is configured as a hose holder, wherein a second functional part is configured as an upwardly open hook for mounting additional parts and is arranged at a height below the first functional part. A fastening contour is provided on the backside of the mounting aid for holding the mounting aid on the domestic appliance, and is arranged at a height above the first functional part and on a fastening leg which extends in the opposite direction of the at least two functional parts. A height stop is provided at least on the topside of the fastening leg for preventing an insertion of the freestanding domestic appliance into an installation niche without prior removal of the mounting aid from the freestanding domestic appliance.

37 Claims, 3 Drawing Sheets

(56) References Cited

U.S. PATENT DOCUMENTS

2012/0205501 A1\* 8/2012 Arzate-Engels ............. 248/68.1
2012/0211609 A1\* 8/2012 Mandic ........................... 248/65

\* cited by examiner

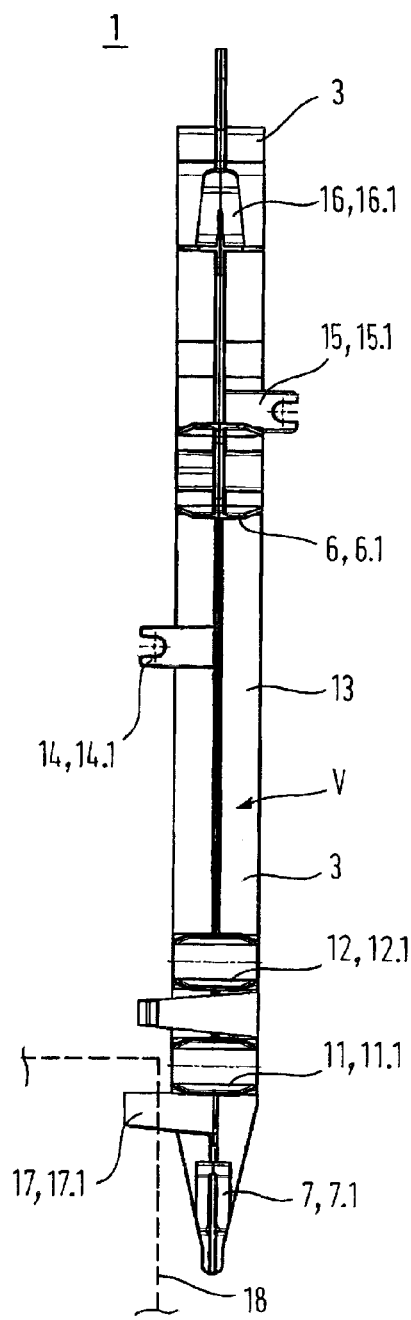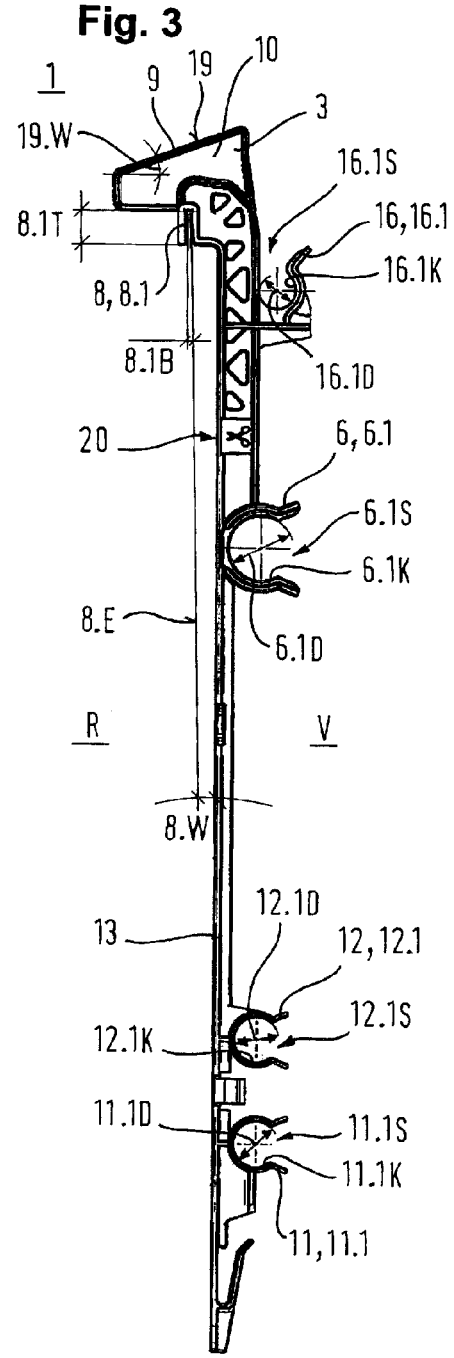

WATER-BEARING DOMESTIC APPLIANCE, IN PARTICULAR DOMESTIC DISH WASHER

BACKGROUND OF THE INVENTION

The invention relates to a freestanding domestic appliance, in particular a domestic dish washer with at least one mounting aid which has at least two functional parts, wherein on the front side of the mounting aid a first functional part is configured as hose holder, wherein on the front side of the mounting aid a second functional part is arranged at a height below the first functional part and is configured as a hook which is open to the top for mounting additional parts, and wherein on the back side of the mounting aid a fastening contour in particular a fastening slot for holding the mounting aid on the freestanding domestic appliance is provided, which fastening slot is arranged at a height above the first functional part and on a fastening leg which extends in opposite direction to the at least two functional parts.

Such a freestanding domestic appliance, in particular a domestic dish washer is known for example from WO 2009/121818 A1. The freestanding domestic appliance has at least one mounting aid which has two functional parts which are configured separable from one another by means of at least one separation point. The first functional part is configured as hose holder, whereas the second functional part is configured as fastening bracket for securing the freestanding domestic appliance before a pulling out from the installation position. In addition, the mounting aid can have further functional parts. Also, a fastening contour is provided on the mounting aid on the back side of the mounting aid for holding the mounting aid on the freestanding domestic appliance, which fastening contour is arranged at a height above the first functional part and on a fastening leg which extends in opposite direction to the at least two functional parts.

In praxis, installation of a freestanding domestic appliance equipped with such a mounting aid into an installation niche of a furniture wall often poses a recurring problem related to the freestanding domestic appliance. This problem is always that the freestanding domestic appliance cannot be fully inserted into the installation niche and thus is not fully flush with the front side of the furniture wall. The sole reason for this appliance related problem is the presence of the mounting aid on the back wall of the treatment container of the freestanding domestic appliance, i.e., the mounting aid is not removed from the back wall of the treatment container of the freestanding domestic appliance. In many cases, the person charged with installing the free standing domestic appliance is capable of recognizing and solving this appliance related installation problem. In some cases however, customer service is requested and charged with the installation of the freestanding domestic appliance due to the encountered installation problem. Requesting customer service causes unnecessary costs and the work of the customer service is usually limited exclusively to the removal of the holding device from the backside of the domestic appliance.

BRIEF SUMMARY OF THE INVENTION

It is thus an object of the invention to refine a freestanding domestic appliance known according to the preamble of the independent claim, in particular a domestic dish washer so that the previously described occurring installation problem can be effectively prevented, preferably its occurrence even eliminated altogether.

According to the invention, this object is solved in that a height stop is provided at least on the top side of the fastening leg of the mounting aid which fastening leg has the fastening contour, in particular the fastening slot for preventing the insertion of the freestanding domestic appliance into an installation niche without prior removal of the mounting aid from the freestanding domestic appliance.

The invention provides a freestanding domestic appliance in particular a domestic dish washer whose installation into an installation niche of a furniture wall can be performed in a simple and reliable manner without appliance related installation problems. The height stop which is provided at least on the top side of the fastening leg of the mounting aid which fastening leg has the fastening contour, in particular the fastening slot, effectively prevents the insertion of the free standing domestic appliance into an installation niche without prior removal of the mounting aid from the freestanding domestic appliance. This allows even a lay person installing the freestanding domestic appliance according to the invention without problems and without repeated insertions into the installation niche. A request for customer service is not required.

The height stop of the mounting aid which is at least provided on the top side of the fastening leg protrudes over the height of the fastening contour, in particular the fastening slot of the mounting aid by at least 20 mm. On one hand, the minimal lengths effectively ensure that a freestanding domestic appliance which is still provided with the mounting aid cannot be inserted into the installation niche of the furniture wall due to the height protrusion, on the other hand a freestanding domestic appliance supplied with such a mounting aid can still be easily packaged without height increase. This packaging is possible because a mounting aid with the mentioned minimal lengths does still not protrude height wise over the conventional packaging means such as for example Styrofoam rails arranged on both sides.

The height stop of the mounting aid which is at least provided on the top side of the fastening leg further has preferably a stop surface which inclines toward the front side of the mounting aid, which stop surface preferably has an inclination angle in the range from 10° to 30°, preferably from 15° to 25°, in particular of about 20°. In the case a mounting aid is unexpectedly present on the back wall of the treatment container of the freestanding domestic appliance, the stop surface with the mentioned range of inclination angle ensures that when inserting this freestanding domestic appliance the insertion motion does not decelerate abruptly but comes to a standstill in a damped manner in a region of the contact between mounting aid and installation niche. An undesired damage to the freestanding domestic appliance can thus be practically excluded.

The fastening slot of the fastening leg of the mounting aid preferably has a slot width in a range from 0.8 to 1.2 mm, preferably of about 1 mm, and a slot depth in a range from 8 to 12 mm, preferably of about 10 mm. The configuration of the fastening slot ensures a durable and reliably a stable and sufficient support of the mounting aid on the freestanding domestic appliance, in particular on the backside of its treatment container.

The mounting aid has as a basic body, preferably configured as a base plate, on the narrow side of which preferably further functional elements such as for example two opposing fastening loops are molded. Preferably, the functional parts and the base plate can transition flush into one another. In this way, the base plate together with the functional parts provides a common stop surface which for example can be brought into contact with a back wall of a treatment container of the freestanding domestic appliance.

Further, the fastening contour, in particular the fastening slot of the fastening leg of the mounting aid preferably forms a fastening plane which extends at an angle relative to the base plate of ≥5°, preferably of ≥15° in particular relative to the back side of the mounting aid. As a result of this geometry, the mounting aid in the attached state is pressed with a pretension against the domestic appliance, in particular against the back wall of its treatment container.

And between the hose holder which is configured as first functional part and the hook which is open to the top and is configured as second functional part, preferably at least two third functional parts are provided which are each configured as a further hose holder. These two third functional parts in the form of a respective hose holder serve preferably for receiving two supply hoses, a supply hose for cold water and a supply hose for heated water. The hose holder which is configured first functional part usually serves for receiving the drainage tube.

The hose holder which is configured as first functional part and the two further hose holders which are configured as the two third functional parts preferably each have an clamping contour at least regions of which are circular with a corresponding opening contour, wherein the hose holder which is configured as first functional part preferably has a clamping diameter of about 18.7 mm, and wherein the two hose holders which are configured as third functional parts preferably each have a clamping diameter of about 13 mm. These diameters are suitable in particular for receiving customary tubes, in particular ½ or ¾ inch tubes.

In addition, a fourth functional part which is arranged at a height above the first functional part is preferably configured as a further hose holder. This further hose holder which is configured as fourth functional part can for example serve for receiving an electric cable and can have a circular contour at least in regions, with a corresponding opening contour and a clamping diameter of about 10.5 mm.

Preferably, a fifths functional part is arranged on a side of the mounting aid and is configured as a stop for horizontally securing a design element, preferably a steam protection element in particular a steam protection sheet metal.

It is also advantageous when the mounting aid is configured to enable a separation between the hose holder which is configured as first functional part and the fastening leg via at least one separation point, wherein the at least one separation point is configured as predetermined break site or bending site. Thus, the respective functional part can be brought from an assembled position into an operating position in which it is separated from the mounting aid. For this, the functional part is separated from the mounting aid at the separation point. Generally, a reduced material thickness can be provided at the separation point or an appropriate perforation.

Further, the mounting aid is preferably made of one material and configured one-piece such as for example an injection molded plastic part. This allows manufacturing the mounting aid without mounting the sections of the mounting aid which are assigned to the functions. For this, the injection molding tools are to be configured so that they can be formed in the injection molding chamber of the basic body delimited thereby together with the functional parts integrated thereon.

The freestanding domestic appliance usually includes a treatment container for receiving goods to be treated such as for example dishes, pots, glasses, cutlery, cooking utensils or the like. The mounting aid is preferably arranged outside, in particular on the back side on the treatment container of the freestanding domestic appliance.

BRIEF DESCRIPTION OF THE DRAWINGS

The invention and its advantageous developments are described in more detail below with reference to schematic drawings, in which:

FIG. 2 shows a schematic front view of a preferred embodiment of a mounting aid of a freestanding domestic appliance according to the invention;

FIG. 3 shows a schematic side view of the mounting aid of a freestanding domestic appliance according to the invention, as shown in FIG. 1;

DETAILED DESCRIPTION OF EXEMPLARY EMBODIMENTS OF THE PRESENT INVENTION

In the Figures, same elements or components, and elements which function or act in the same manner are provided with the same reference signs. Only those components of the freestanding domestic appliance according to the invention, in particular of the domestic dish washer are provided with reference signs and are explained, that are relevant for understanding the invention. Of course, a freestanding domestic appliance according to the invention can also include further components or component groups.

Figure 1:
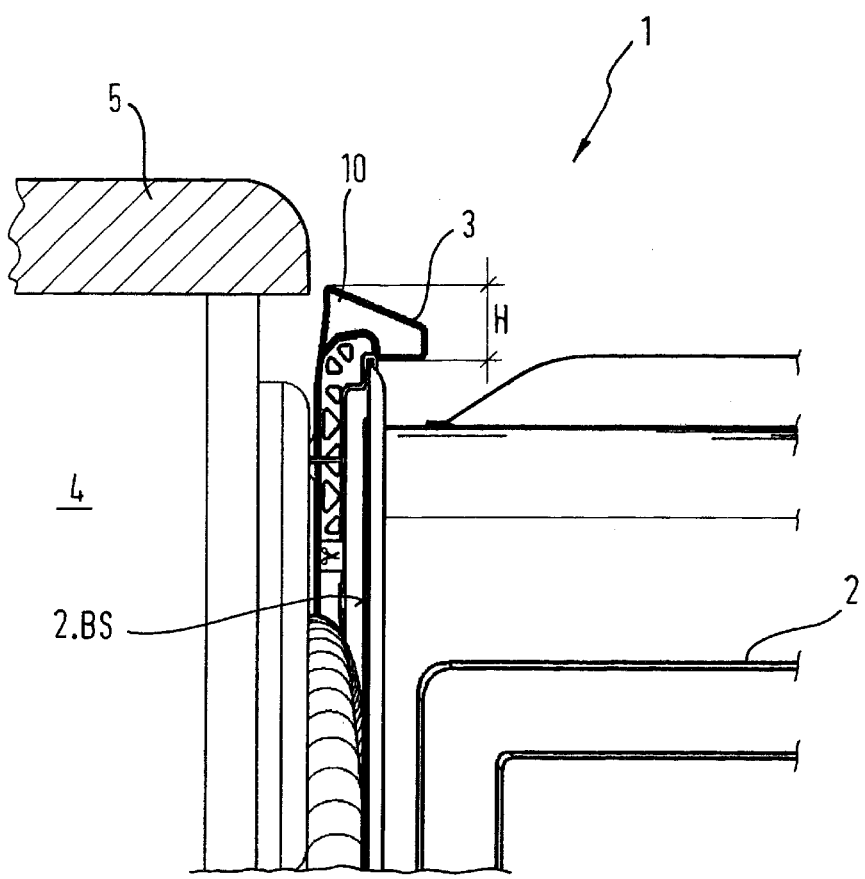
FIG. 1 shows a schematic representation of an installation of a preferred embodiment of a freestanding domestic appliance according to the invention with a mounting aid in an installation niche.

The freestanding domestic appliance 1 shown schematically in FIG. 1 forms in particular a domestic dish washer and has a treatment container 2 for receiving wash ware such as dishes, pots, cutlery, glasses cooking utensils and others. It is provided that the freestanding domestic appliance which is provided with a mounting aid 3 is inserted and thus installed in an installation niche 4 of a not further shown furniture wall. The installation niche 4 in the present configuration is delimited on its top side by a countertop 5. Instead of the countertop 5 another known furniture item can also be provided.

The mounting aid 3 has at least two functional parts 6, 7 (cf. FIG. 2). A first functional part 6, arranged on the front side (cf. FIG. 3) is configured as a hose holder 6.1, whereas a second functional part 7 which is arranged at a height below the first functional part and also on the front side is configured as a hook 7.1 which is open to the top for mounting additional parts, such as for example printed publications and stickers. On the back side R (cf. FIG. 3) of the mounting aid 3, a fastening contour 8, in particular a fastening slot 8.1 for the holding of the mounting aid on the freestanding domestic appliance 1 is provided (see also FIG. 3). The fastening contour 8 is arranged at a height above the first functional part 6 and on a fastening leg 9 which extends in opposite direction to the at least two functional parts 6, 7.

On the fastening leg 9 of the mounting aid 3, which fastening leg has the fastening contour 8, in particular the fastening slot 8.1, a height stop 10 for preventing an insertion of the freestanding domestic appliance 1 into the installation niche 4 without prior removal of the mounting aid 3 of the domestic appliance 1 is provided, at least on the top side of the fastening leg.

The height stop 10 of the mounting aid 3, which is provided at least on the top side of the fastening leg 9, protrudes over the fastening contour 8, in particular over the fastening slot 8.1, of the fastening leg 9 of the mounting aid 3 height wise by at least 10 mm, preferably by at least 15 mm, in particular by at least 20 mm. the height wise protrusion is indicated by the reference sign H.

The mounting aid 3 is preferably arranged outside, in particular on the backside 2.RS on the treatment container 2 of the freestanding domestic appliance 1. However, as an alternative it may also be arranged on a side of the treatment container 2 of the freestanding domestic appliance 1.

Figure 4:
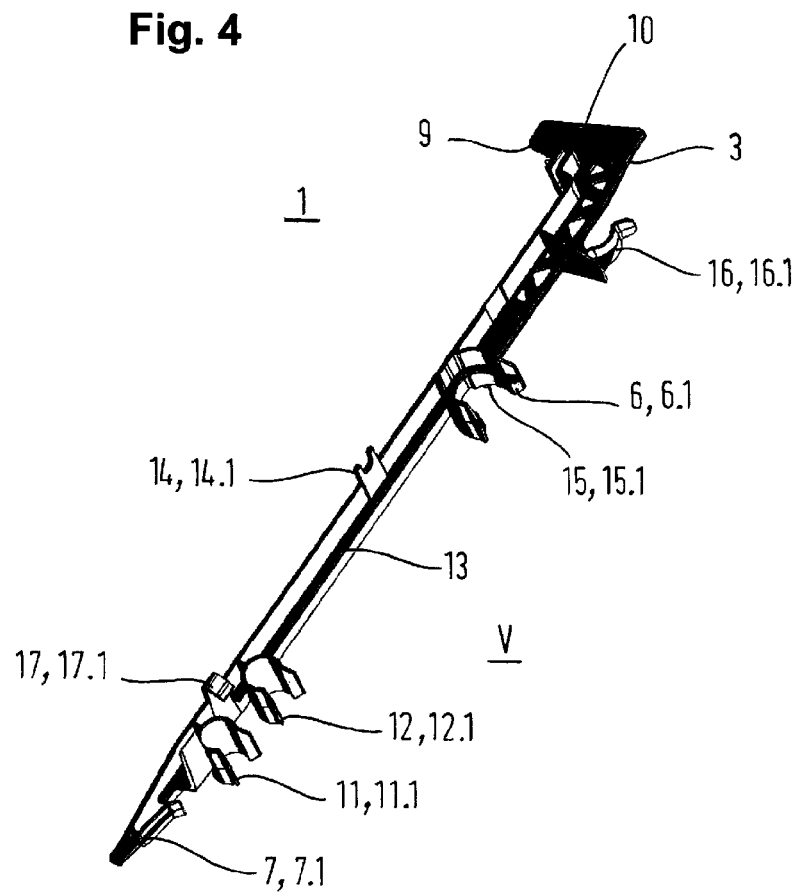
FIG. 4 shows a schematic perspective view of the mounting aid of a freestanding domestic appliance according to the invention, as shown in the FIGS. 2 and 3.

The mounting aid 3 which can be arranged on the freestanding domestic appliance 1 is preferably the mounting aid 3 shown in the FIGS. 2 to 4.

FIG. 2 shows a schematic front view of a preferred embodiment of a mounting aid 3 of a not shown freestanding domestic appliance 1 according to the invention.

The mounting aid 3 is made of one material and configured one-piece and has as previously mentioned at least two functional parts 6, 7. A first functional part which is arranged on the front side V is configured as a hose holder 6.1, whereas a second functional part which is arranged at a height below the first functional part 6 and also on the front side V is configured as a hook 7.1 which is open to the top for mounting additional parts such as for example printed publications and stickers.

Further, at least two third functional parts 11, 12 are formed between the first functional part 6 which is configured as hose holder 6.1 and the hook 7.1 which is open to the top and configured as second functional part 7 for mounting additional parts, each of which at least two third functional parts 11, 12 is configured as further hose holder 11.1, 12.1.

The mounting aid 3 further has a base plate 13 configured as basic body on whose narrow side preferably further functional elements 14, 15 such as for example two opposing and height wise offset fastening loops 14.1, 15.1 are molded. The two fastening loops 14.1, 15.1 are open to one side in order to be able to be demolded from an injection molding tool.

And a fourth functional part 16 which is arranged at a height above the first functional part 6 is configured as a further hose holder 16.1, whereas a fifth functional part 17 is arranged on a side of the mounting aid 3 and is configured as a stop 17.1 for horizontally securing a known and only schematically indicated design element 18, preferably a steam protection element, in particular a steam protection sheet metal.

FIG. 3 shows a schematic side view of the mounting aid 3 of a freestanding domestic appliance 1 as shown in FIG. 2.

The height stop 10 of the mounting aid 3, which height stop 10 is provided at least on the top side of the fastening leg 9 has a stop surface 19 which inclines towards the front side V of the mounting aid 3, and preferably has an inclination angle 19.W in a range from 10° to 30°, preferably from 15° to 25°, in particular of about 20°.

The fastening slot 8.1 of the fastening leg of the mounting aid 3 further has a slot width 8.1B in a range of from 0.8 to 1.2 mm, preferably of about 1 mm and a slot depth 8.1T in a range of 8 to 12 mm preferably of about 10 mm. The fastening contour 8 in particular the fastening slot 8.1 of the fastening leg 9 of the mounting aid 3 also forms a fastening plane 8.E which extends at an angle 8.W of ≥5°, in particular of ≥10°, in particular 15° in relation to the base plate 13, in particular in relation to its back side R, of the mounting aid 3.

The hose holder 6.1 which is configured as first functional part 6 and the two further hose holders 11.1, 12.1 which are configured as third functional parts each have at least regionally a circular clamping contour 6.1K, 11.1K, 12.1K with a corresponding opening contour 6.1S, 11.1S, 12.1S. The hose holder 6.1 which is configured as first functional part 6 has a clamping diameter 6.1D of about 18.7 mm, whereas the two further hose holders 11.1, 12.1 which are configured as third functional parts each have a clamping diameter 11.1D, 12.1D of about 13 mm. These diameters are particularly suitable for receiving customary tubes, in particular ½ or ¾ inch tubes.

The hose holder 16.1 which is configured as fourth functional part 16 in the other hand has at least in regions circular clamping contour 16.1K with corresponding opening contour 16.1S and a clamping diameter 16.1D of about 10.5 mm. This clamping diameter is particularly suited for receiving conventional electric tubes.

It can also be seen from FIG. 3 that the mounting aid 3 is configured so as to be separable between the hose holder 6.1 which is configured as first functional part 6 and the fastening leg 9 by means of at least one separation point 20, wherein the at least one separation point 20 is preferably configured as predetermined breaking point or bending point. A reduced material thickness or an appropriate perforation can be provided at the separation point 20.

FIG. 4 shows a schematic perspective representation of the mounting aid 3 of a freestanding domestic appliance 1 according to the invention shown in the FIGS. 2 and 3.

This schematic perspective representation clearly shows the spatial arrangement of the different already described functional parts 6, 7, 11, 12, 14, 15, 16, 17 on the base plate 13 of mounting aid 3:

the first functional part 6 which is arranged on the front side V of the mounting aid 3 (hose holder 6.1);

the second, functional part 7 (hook 7.1) which is arranged at a height below the first functional part 6 and also arranged on the front side V of the mounting aid 3;

two third functional parts 11, 12 (hose holder 11.1, 12.1) which are provided between the first functional part 6 and the second functional part 7;

further functional parts 14, 15 (fastening loops 14.1, 15.1)

the fourth functional part 16 (further hose holder) which is arranged at a height above the first functional part 6; and the fifth functional part (stop 17.1) which is arranged on a side of the mounting aid 3.

Also provided is the height stop 10 which is arranged at least on a topside of the fastening leg 9 of the mounting aid 3 for preventing insertion of the freestanding domestic appliance 1 into an installation niche without prior removal of the mounting aid 3 from the freestanding domestic appliance.

Figure 5:
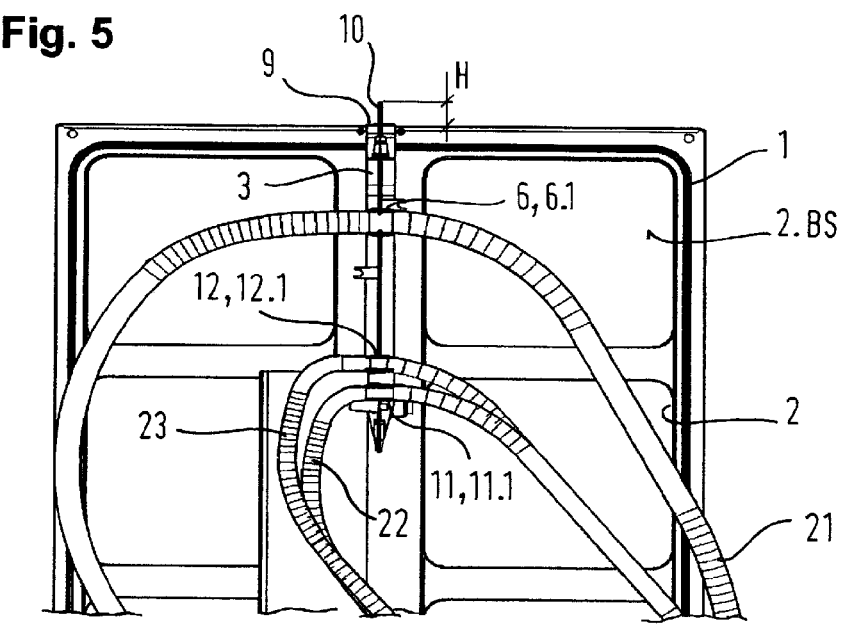
FIG. 5 shows a schematic rear view of the freestanding domestic appliance according to the invention shown in FIG. 1 with a mounting aid in a shipping state.

FIG. 5 shows a schematic rear view of the freestanding domestic appliance according to the invention shown in FIG. 1 with a mounting aid 3 in a shipping state.

On the mounting aid 3 which is arranged on the backside 2.BS of the treatment container 2 of the freestanding domestic appliance 1, a purely exemplary drain hose 21 is received on the hose holder 6.1 which is configured as first functional part 6. On each of the two third functional parts 11, 12 which are configured as respective hose holders 11.1, 12.1, a supply hose 22, 23 for example a supply hose 22 for cold water and a supply hose 23 for heated water is received.

Further, the height stop 10 for preventing an insertion of the freestanding domestic appliance 1 into an installation niche without prior removal of the mounting aid 3 from the freestanding domestic appliance 1 can be seen. The height stop 10 of the mounting aid 3 protrudes height wise over the fastening contour 8, in particular the fastening slot 8.1 of the fastening leg 9 of the mounting aid 3 by at least 10 mm, preferably by at least 15 mm, in particular by at least 20 mm. The height wise protrusion is indicated by the reference sign H (cf. FIG. 3).

In summary, a freestanding domestic appliance in particular a domestic dish washer known from the preamble of the independent claim, is refined by the invention so that the previously possible and described appliance related installation problem can be effectively prevented, preferably its occurrence can be excluded altogether.

What is claimed is:

1. A freestanding domestic appliance, comprising:
    at least one mounting aid having at least two functional parts arranged on a front side of the mounting aid, with a first one of the functional parts being configured as a hose holder, and a second one of the functional parts being arranged at a height below the first functional part and configured as an upwardly open hook for mounting additional parts;
    a fastening leg extending in opposite direction to the at least two functional parts; a fastening contour arranged on the fastening leg and on a backside of the mounting aid at a height above the first functional part for holding the mounting aid on the freestanding domestic appliance; and
    a height stop provided on the fastening leg of the mounting aid, wherein the height stop has a stop surface, said stop surface being inclined continuously toward the front side of the mounting aid for preventing an insertion of the freestanding domestic appliance into an installation niche without prior removal of the mounting aid from the freestanding domestic appliance.

2. The freestanding domestic appliance of claim 1, constructed in the form of a domestic dish washer.

3. The freestanding domestic appliance of claim 1, wherein the fastening contour is configured as a fastening slot.

4. The freestanding domestic appliance of claim 1, wherein the height stop protrudes height wise over the fastening contour by at least 10 mm.

5. The freestanding domestic appliance of claim 1, wherein the height stop protrudes height wise over the fastening contour by at least 15 mm.

6. The freestanding domestic appliance of claim 1, wherein the height stop protrudes height wise over the fastening contour by at least 20 mm.

7. The freestanding domestic appliance of claim 4, wherein the fastening contour is configured as a fastening slot.

8. The freestanding domestic appliance of claim 5, wherein the fastening contour is configured as a fastening slot.

9. The freestanding domestic appliance of claim 6, wherein the fastening contour is configured as a fastening slot.

10. The freestanding domestic appliance of claim 1, wherein said stop surface is inclined toward the front side of the mounting aid at an inclination angle within in a range from 10° to 30°.

11. The freestanding domestic appliance of claim 10 wherein the inclination angle is within a range from 15° to 25°.

12. The freestanding domestic appliance of claim 10, wherein the inclination angle is about 20°.

13. The freestanding domestic appliance of claim 7, wherein the fastening slot of the fastening leg has a slot width within a range from 0.8 to 1.2 mm and a slot depth within a range from 8 to 12 mm.

14. The freestanding domestic appliance of claim 7, wherein the fastening slot of the fastening leg has a slot width of about 1 mm, and a slot depth of about 10 mm.

15. The freestanding domestic appliance of claim 1, wherein the mounting aid has a base plate configured as basic body, wherein the freestanding domestic appliance further comprises further functional elements molded to a narrow side of the base plate.

16. The freestanding domestic appliance of claim 15, wherein the further functional elements include two opposing fastening loops.

17. The freestanding domestic appliance of claim 16, wherein the fastening contour forms a fastening plane extending at an angle in relation to the base plate of ≥5°.

18. The freestanding domestic appliance of claim 17, wherein the angle is ≥10°.

19. The freestanding domestic appliance of claim 17, wherein the angle is ≥15°.

20. The freestanding domestic appliance of claim 17, wherein the fastening contour is configured as a fastening slot.

21. The freestanding domestic appliance of claim 18, wherein the fastening contour is configured as a fastening slot.

22. The freestanding domestic appliance of claim 19, wherein the fastening contour is configured as a fastening slot.

23. The freestanding domestic appliance of claim 16, wherein the fastening contour forms a fastening plane extending at and an angle in relation to the back side of the mounting aid of ≥5°.

24. The freestanding domestic appliance of claim 23, wherein the angle is ≥10°.

25. The freestanding domestic appliance of claim 23, wherein the angle is ≥10°.

26. The freestanding domestic appliance of claim 23, wherein the angle is ≥15°.

27. The freestanding domestic appliance of claim 1, further providing at least two third functional parts, each of said two third functional parts being configured as a further hose holder and being provided between the first functional part and the second functional part.

28. The freestanding domestic appliance of claim 27, wherein at least regions of the first functional part and the two third functional parts have circular clamping contour with a corresponding opening contour, and wherein the first functional part has a clamping diameter of about 18.7 mm and the two third functional parts each have a clamping diameter of about 13 mm.

29. The freestanding domestic appliance of claim 1, further comprising a fourth functional part configured as another hose holder and being arranged at a height above the first functional part.

30. The freestanding domestic appliance of claim 29, wherein at least a region of the fourth functional part has a circular clamping contour with a corresponding opening contour and a clamping diameter of about 10.5 mm.

31. The freestanding domestic appliance of claim 1, further comprising a fifth functional part arranged on a side of the mounting aid and a design element, said fifth functional part being constructed for as a stop for horizontally securing the design element.

32. The freestanding domestic appliance of claim 31, wherein the design element is constructed a steam protection element.

33. The freestanding domestic appliance of claim 1, wherein the mounting aid is configured to enable a separation between the first functional part and the fastening leg via at least one separation point.

34. The freestanding domestic appliance of claim 33, wherein the at least one separation point is configured as a predetermined breaking point or a bending point.

35. The freestanding domestic appliance of claim 1, wherein the mounting aid is made of one material and is constructed one-piece.

36. The freestanding domestic appliance of claim 1, further comprising a treatment container for receiving ware to be treated, wherein the mounting aid is arranged on an outside of the treatment container of the freestanding domestic appliance.

37. The freestanding domestic appliance of claim 36, wherein the mounting aid is arranged on in particular on a back side of the treatment container.

* * * * *